UNITED STATES PATENT OFFICE.

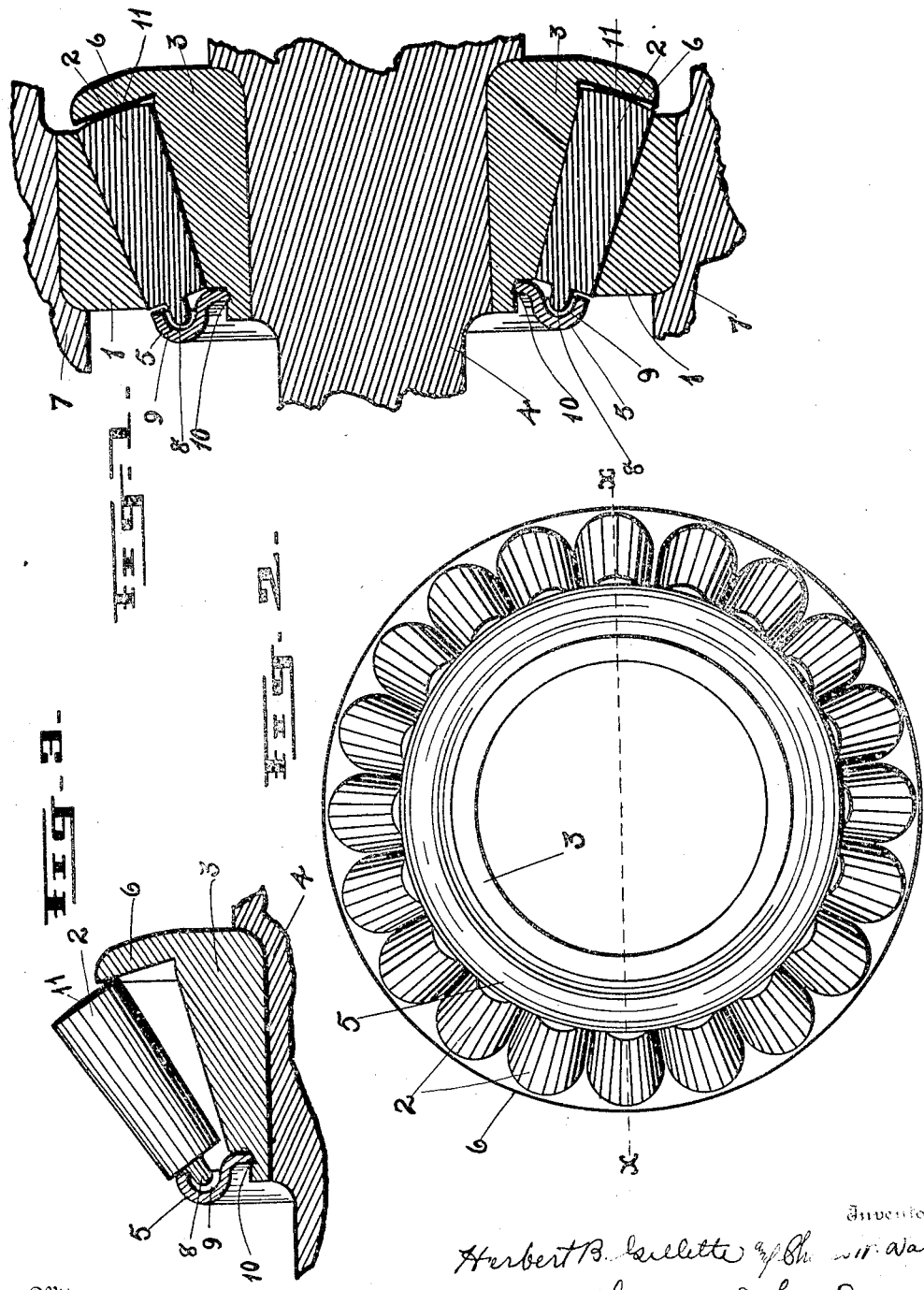

HERBERT B. GILLETTE AND CHARLES W. DAKE, OF GRAND RAPIDS, MICHIGAN; SAID DAKE ASSIGNOR TO RICHARD G. PETERS, OF MANISTEE, MICHIGAN.

ROLLER-BEARING.

No. 892,416.  Specification of Letters Patent.  Patented July 7, 1908.

Application filed January 21, 1907. Serial No. 353,259.

*To all whom it may concern:*

Be it known that we, HERBERT B. GILLETTE and CHARLES W. DAKE, citizens of the United States, residing at the city of Grand Rapids, county of Kent, State of Michigan, have invented certain new and useful Improvements in Roller-Bearings, of which the following is a specification.

This invention relates to improvements in roller bearings.

It relates particularly to roller bearings having conical rollers and cones.

The objects of this invention are, first, to provide an improved roller bearing having conical rollers and cones in which the bearing rollers are retained without the use of cages or journal pins therefor. Second, to provide an improved roller bearing having conical bearing rollers and cones in which the rollers impinge each other and both cones from end to end of the rollers. Third, to provide an improved roller bearing in which the parts are simple and economical in structure, few in number and easily assembled. Fourth, to provide an improved roller bearing in which the parts are so arranged that the wear and friction of the parts is reduced to a minimum.

Further objects, and objects relating to details of construction, will definitely appear from the detailed description to follow.

A structure embodying the features of our invention is clearly illustrated in the accompanying drawing, forming a part of this specification, in which, Figure 1 is a detail longitudinal section of our improved bearing, taken on a line corresponding to line X—X of Fig. 2. Fig. 2 is an end elevation of our improved bearing with the outer cone or boxing cone removed. Fig. 3 is a detail section taken on a line corresponding to line X—X of Fig. 2, showing how the rollers are retained on the cone.

In the drawing, similar reference characters refer to similar parts throughout the several views.

Referring to the drawing, the outer or boxing cone 1 is adapted to be inserted in a suitable hub, as 7, or it is evident it may be formed integral with the wheel or pulley. The rollers 2 are conical and are formed of a uniform taper from end to end. The outer or enlarged ends of the rollers are formed crowning or convex as at 11 so that they bear only at central points against the projecting flange 6 of the inner cone 3. At the small ends of the rollers are axially-projecting retaining pins 8, which, when the structure is assembled, project into the groove 9 of the retaining ring 5. This retaining ring is preferably sleeved upon the cone 3 which is shouldered to form an abutment therefor. The ring is preferably retained by spinning up or upsetting the end of the bearing cone as at 10. It is evident that it might be secured in numerous ways.

We have illustrated the cone 3 mounted upon the axle 4 as it is one of the objects of this invention to provide an effective roller bearing for vehicle wheels, such as automobiles, and the like. It will be understood that when adapted for this purpose, the bearings are arranged in pairs, and, on account of the conical features, serve as effective thrust bearings.

The groove 9 in the retaining ring 5 is of such size that, when the boxing cone 1 is in place with the parts in their normal operating relation, the retaining pins 8 of the rollers do not contact with the ring, but merely serve to retain the rollers in position when the outer or boxing cone is removed. The flange 6 of the inner bearing cone 3 is inclined inwardly so that it not only serves as an effective thrust bearing for the convex or crowning end of the rollers, but co-acts with the flange 5 in retaining the rollers, it being impossible to disengage the same therefrom without removing the flange 5; see Fig. 3. By thus arranging the parts, the necessity for cages or journals for the rollers is obviated. The rollers are entirely free to travel about the cones and impinge with each other and with the cones throughout the entire length of the rollers. This keeps the rollers in proper position relative to each other and to the cones and distributes the load thereon. Another very great advantage is that when the outer or boxing cone is removed the rollers can be very easily shifted about to permit of a thorough cleaning of the cone and of the rollers without removing the rollers.

Our improved bearing is very strong and durable, it being evident that there are no weak parts which are subject to strain and no parts requiring accurate adjustment in assembling. The retaining ring 5 is easily applied, and it is evident that it will perform its function although it may not be a perfect fit. It is, however, very easy to secure an accurate adjustment and fitting of the parts.

Numerous other advantages than those specifically mentioned will readily appear to those skilled in the art to which this invention relates.

We have illustrated and described our improved bearing in detail in the form preferred by us on account of the structural simplicity and economy and convenience with which it may be assembled. We are, however, aware that it is capable of considerable variation in structural details without departing from our invention.

Having thus described our invention, what we claim as new and desire to secure by Letters Patent is:

1. In a bearing, the combination with an inner bearing cone provided with an outwardly-projecting flange at its large end and a retaining ring at its small end, said retaining ring having an annular groove in its inner face; an outer boxing or bearing cone; conical rollers of uniform taper from end to end, the large ends of said rollers being convexed and the small ends being provided with axially-projecting retaining pins adapted to project into said groove of said retaining ring, which is so arranged that the said retaining pins are normally out of contact therewith, said flange on said bearing cone being of sufficient width to coact with said retaining ring in loosely securing said rollers to said inner cone when said outer cone is removed, said flange being adapted to serve as a thrust bearing for the convexed ends of said rollers, the plane of the inner face of said flange being at a right angle to the axes of said rollers, said rollers being adapted to impinge each other and said bearing cones from end to end when the parts are assembled.

2. In a bearing, the combination with an inner bearing cone provided with an outwardly-projecting flange at its large end and a retaining ring at its small end, said retaining ring having an annular groove in its inner face; an outer boxing or bearing cone; conical rollers of uniform taper from end to end, the large ends of said rollers being convexed and the small ends being provided with axially-projecting retaining pins adapted to project into said groove of said retaining ring, which is so arranged that the said retaining pins are normally out of contact therewith, said flange on said bearing cone being of sufficient width to coact with said retaining ring in loosely securing said rollers to said inner cone when said outer cone is removed, said flange being adapted to serve as a thrust bearing for the convexed ends of said rollers, the plane of the inner face of said flange being at a right angle to the axes of said rollers.

3. In a bearing, the combination with an inner bearing cone provided with an outwardly-projecting flange at its large end and a retaining ring at its small end, said retaining ring having an annular groove in its inner face; an outer boxing or bearing cone; conical rollers of uniform taper from end to end, their small ends being provided with axially-projecting retaining pins adapted to project into said groove of said retaining ring, which is so arranged that the said retaining pins are normally out of contact therewith, said flange on said bearing cone being arranged to serve as a thrust bearing for said rollers and being of sufficient width to coact with said retaining ring in loosely securing said rollers to said inner cone when said outer cone is removed, said rollers being adapted to impinge each other and said bearing cones from end to end when the parts are assembled.

4. In a bearing, the combination with an inner bearing cone provided with an outwardly-projecting flange at its large end and a retaining ring at its small end, said retaining ring having an annular groove in its inner face; an outer boxing or bearing cone; conical rollers of uniform taper from end to end, their small ends being provided with axially-projecting retaining pins adapted to project into said groove of said retaining ring, which is so arranged that the said retaining pins are normally out of contact therewith, said flange on said bearing cone being arranged to serve as a thrust bearing for said rollers and being of sufficient width to coact with said retaining ring in loosely securing said rollers to said inner cone when said outer cone is removed.

5. In a bearing, the combination with an inner bearing member provided with an outwardly-projecting flange at one end and a retaining ring at the other, said retaining ring having an annular groove in its inner face; an outer bearing member; bearing rollers convexed at one end and provided with axially-projecting retaining pins at the other adapted to project into said groove of said retaining ring, which is so arranged that the said retaining pins are normally out of contact therewith, said flange on said inner bearing member being of sufficient width to coact with said retaining ring in loosely securing said rollers to said inner bearing member when said outer bearing member is removed, said flange being adapted to serve as a thrust bearing for the convexed ends of said rollers, the plane of the inner face of said flange being at a right angle to the axes of said rollers, said rollers being adapted to impinge each other and said bearing members from end to end when the parts are assembled.

6. In a bearing, the combination with an inner bearing member provided with an outwardly-projecting flange at one end and a retaining ring at the other, said retaining ring having an annular groove in its inner face; an outer bearing member; bearing rollers convexed at one end and provided with axially-projecting retaining pins at the other adapted to project into said groove of said retaining ring, which is so arranged that the said retaining pins are normally out of contact therewith, said flange on said inner bearing member being of sufficient width to coact with said retaining ring in loosely securing said rollers to said inner bearing member when said outer bearing member is removed, said flange being adapted to serve as a thrust bearing for the convexed ends of said rollers, the plane of the inner face of said flange being at a right angle to the axes of the rollers.

7. In a bearing, the combination with an inner bearing member provided with an outwardly-projecting flange at one end and a retaining ring at the other, said retaining ring having an annular groove in its inner face; an outer bearing member; bearing rollers provided with axially-projecting retaining pins at one end adapted to project into said groove of said retaining ring, which is so arranged that the said retaining pins are normally out of contact therewith, said flange on said inner bearing member being arranged to serve as a thrust bearing for said rollers and being of sufficient width to coact with said retaining ring in loosely securing said rollers to said inner bearing member when said outer bearing member is removed, said rollers being adapted to impinge each other and said bearing members from end to end when the parts are assembled.

8. In a bearing, the combination with an inner bearing member provided with an outwardly-projecting flange at one end and a retaining ring at the other, said retaining ring having an annular groove in its inner face; an outer bearing member; bearing rollers provided with axially-projecting retaining pins at one end adapted to project into said groove of said retaining ring, which is so arranged that the said retaining pins are normally out of contact therewith, said flange on said inner bearing member being arranged to serve as a thrust bearing for said rollers and being of sufficient width to coact with said retaining ring in loosely securing said rollers to said inner bearing member when said outer bearing member is removed.

9. In a bearing, the combination with an inner bearing member provided with an outwardly-projecting flange at one end and a retaining ring at the other; bearing rollers convexed at one end and provided with axially-projecting retaining pins at the other, said retaining ring being so arranged that the said retaining pins are normally out of contact therewith, said flange on said inner bearing member being of sufficient width to coact with said retaining ring in loosely securing said rollers to said inner bearing member, said flange being adapted to serve as a thrust bearing for the convexed ends of said rollers, the plane of the inner face of said flange being at a right angle to the axes of the rollers, said rollers being adapted to impinge each other.

10. In a bearing, the combination with an inner bearing member provided with an outwardly-projecting flange at one end and a retaining ring at the other; bearing rollers convexed at one end and provided with axially-projecting retaining pins at the other, said retaining ring being so arranged that the said retaining pins are normally out of contact therewith, said flange on said inner bearing member being of sufficient width to coact with said retaining ring in loosely securing said rollers to said inner bearing member, said flange being adapted to serve as a thrust bearing for the convexed ends of said rollers, the plane of the inner face of said flange being at a right angle to the axes of the rollers.

11. In a bearing, the combination with an inner bearing member provided with an outwardly-projecting flange at one end and a retaining ring at the other; bearing rollers provided with axially-projecting retaining pins at one end, said retaining ring being so arranged that the said retaining pins are normally out of contact therewith, said flange on said inner bearing member being arranged to serve as a thrust bearing for said rollers and being of sufficient width to coact with said retaining ring in loosely securing said rollers to said inner bearing member, said rollers being adapted to normally impinge each other.

12. In a bearing, the combination with an inner bearing member provided with an outwardly-projecting flange at one end and a retaining ring at the other; bearing rollers provided with axially-projecting retaining pins at one end, said retaining ring being so arranged that the said retaining pins are normally out of contact therewith, said flange on said inner bearing member being arranged to serve as a thrust bearing for said rollers and being of sufficient width to coact with said retaining ring in loosely securing said rollers to said inner bearing member.

In witness whereof, we have hereunto set our hands and seals in the presence of two witnesses.

HERBERT B. GILLETTE. [L. S.]
CHARLES W. DAKE. [L. S.]

Witnesses:
PETER DORAN,
VICTOR HILDING.